United States Patent
Dar

(10) Patent No.: US 10,860,584 B2
(45) Date of Patent: Dec. 8, 2020

(54) METHOD AND SYSTEM FOR PERFORMING INNER-JOINS ON A SHARDED DATA SET

(71) Applicant: Google LLC, Mountain View, CA (US)

(72) Inventor: Yaacov Dar, Givatayim (IL)

(73) Assignee: Google LLC, Mountain View, CA (US)

( * ) Notice: Subject to any disclaimer, the term of this patent is extended or adjusted under 35 U.S.C. 154(b) by 258 days.

(21) Appl. No.: 15/928,286

(22) Filed: Mar. 22, 2018

(65) Prior Publication Data

US 2019/0294717 A1 Sep. 26, 2019

(51) Int. Cl.
*G06F 16/27* (2019.01)
*G06F 16/2455* (2019.01)
*G06F 16/2458* (2019.01)

(52) U.S. Cl.
CPC ...... *G06F 16/2456* (2019.01); *G06F 16/2471* (2019.01); *G06F 16/24561* (2019.01); *G06F 16/27* (2019.01); *G06F 16/278* (2019.01)

(58) Field of Classification Search
None
See application file for complete search history.

(56) References Cited

U.S. PATENT DOCUMENTS

| | | | |
|---|---|---|---|
| 8,190,610 B2 | 5/2012 | Dasdan et al. | |
| 10,268,714 B2* | 4/2019 | Chen | G06F 16/2228 |
| 2014/0297921 A1* | 10/2014 | Chang | G06F 12/0246 |
| | | | 711/103 |
| 2017/0116267 A1 | 4/2017 | Boehme et al. | |

OTHER PUBLICATIONS

International Search Report and Written Opinion for International Application No. PCT/US2019/021546 dated May 22, 2019. 16 pages.
Nicolas: "Hadoop Basics V: Repartition Join in MapReduce." Jan. 29, 2016 (Jan. 29, 2016), pp. 1-8, XP055588743, Retrieved from the Internet: <http://blog.ditullio.fr/2016/01/29/hadoop-basics-repartition-join-mapreduce/>. [retrieved on May 15, 2019].

(Continued)

*Primary Examiner* — Tuankhanh D Phan
(74) *Attorney, Agent, or Firm* — Lerner, David, Littenberg, Krumholz & Mentlik, LLP

(57) ABSTRACT

In a distributed database, an inner join of very large data sets is performed by distributing smaller jobs to a plurality of computing devices. For each key, values in a first input are partitioned into a first set block set, and values in a second input are partitioned into a second block set. For each key, the first block set is replicated by a number of blocks in the second block set, and the second block set is replicated by a number of blocks in the first block set. Each replicated block is assigned a block-key including the key and additional information to identify the replicated block. Each pair of replicated blocks having matching block-keys are distributed to one of a plurality of computing devices. Results for the inner join are received from the plurality of computing devices.

20 Claims, 8 Drawing Sheets

(56) References Cited

OTHER PUBLICATIONS

Spyros Blanas et al.: "A Comparison of Join Algorithms for Log Processing in MapReduce." Proceedings of the 2010 International Conference on Management of Data, SIGMOD '10, ACM Press, New York, New York, USA. Jun. 6, 2010 (Jun. 6, 2010), pp. 975-986, XP058087531, DOI: 10.1145/1807167.1807273, ISBN:978-1-4503-0032-2, sections 3 and 3.1.
Meijer, Erik and Bierman, Gavin, "A co-Relational Model of Data for Large Shared Data Banks", ACMQUEUE (2011), 19 pgs.
Xu, Yu and Kostamaa, Pekka, "Efficient Outer Join Data Skew Handling in Parallel DBMS", VLDB Endowment, ACM (2009), 7 pgs.
Blanas, Spyros, et al., "A Comparison of Join Algorithms for Log Processing in MapReduce", SIGMOD'10 ACM (2010), 12 pgs.
Diamos, Gregory, et al., "Relational Algorithms for Multi-Bulk-Synchronous Processors", PPoPP'13, ACM (2013), 2 pgs.
Graefe, et al., "Hash Joins and Hash Teams in Microsoft SOL Server", Proceedings of the 24th VLDB Conference New York,USA (1998), 12 pgs.

\* cited by examiner

Inner Join Resulting Table — 450

| Name | Shirt Color | Pants Color |
|------|-------------|-------------|
| Anne | Red | Black |
| Anne | Red | Grey |
| Anne | Red | White |
| Anne | Yellow | Black |
| Anne | Yellow | Grey |
| Anne | Yellow | White |
| Anne | Orange | Black |
| Anne | Orange | Grey |
| Anne | Orange | White |
| Anne | Brown | Black |
| Anne | Brown | Grey |
| Anne | Brown | White |
| Anne | Tan | Black |
| Anne | Tan | Grey |
| Anne | Tan | White |

FIG. 4D

METHOD AND SYSTEM FOR PERFORMING INNER-JOINS ON A SHARDED DATA SET

BACKGROUND

In a distributed database, a large set of data may be split into multiple shards and stored separately on a plurality of computing devices in a distributed system. One way to collect information from more than one of the distributed shards is to perform an inner join of two shards. An inner join is an operation that combines two input tables, each being a set of key-value pairs, to produce a new resulting table containing all possible combination of values from the two input tables for each matching key.

BRIEF SUMMARY

The present disclosure provides for receiving a request to perform an inner join of stored data of a first input comprising a first set of key-value pairs and a second input comprising a second set of key-value pairs; determining, by one or more processors, a block size, the block size being a target number of values to be partitioned into a block; partitioning, by the one or more processors for each key, the values in the first input into a first block set; partitioning, by the one or more processors for each key, the values in the second input into a second block set; replicating, by the one or more processors for each key, the first block set by a number of blocks in the second block set for the same key, to obtain a first replicated block set; replicating, by the one or more processors for each key, the second block set by a number of blocks in the first block set for the same key, to obtain a second replicated block set; assigning, by the one or more processors, a block-key to each replicated block in the first replicated block set and each replicated block of the second replicated block set, the block-key comprising the key and additional information to identify the replicated block; distributing, by the one or more processors, each pair of replicated blocks having matching block-keys to one of a plurality of computing devices for processing; and receiving, from each of the plurality of computing devices, results for the inner join, the results for the inner join include at least one value-pair from one of the pairs of replicated blocks.

Determining the block size may be based on at least one of a total number of the plurality of computing devices, processing capacities of the plurality of computing devices, or a uniformity in number of values per block. The block size may be a smallest block size whose block-key mapping will not cause any of the plurality of computing devices to run out of operational memory.

At least one of the partitioning of values in the first input or the partitioning of values in the second input may be based on a uniform distribution.

The block-key may comprise a first index, the first index being assigned sequentially as the values in the first input are partitioned into the first block set and the values in the second input are partitioned into the second block set. The block-key may comprise a second index, the second index being assigned sequentially as the first block set and second block set are replicated. The method may further comprise sending a block-key mapping containing all the block-keys to each of the plurality of computing devices.

The replicated block pairs may be distributed to the plurality of computing devices based on at least one of the block size, a total number of replicated block pairs, a total number of the plurality of computing devices, or processing capacities of the plurality of computing devices.

The method may further comprise estimating an approximate number of blocks needed for each key for at least one of the first input or the second input by sampling at least one of the first input or the second input at every block-sized interval. The method may further comprise grouping the key-value pairs of at least one of the first input or the second input by key; determining, for each key, a remainder number of values based on an assumption that each of the approximate number of blocks contains block-sized number of values; and adjusting the approximate number of blocks needed for one or more keys based on the remainder number of values for the key. The approximate number of blocks needed for one or more keys may be adjusted when the remainder number of values for the key is greater than a predetermined threshold value. The method may further comprise determining that one or more keys are omitted during the sampling, and setting an approximate number of blocks needed for the one or more keys omitted during the sampling.

At least one of the first input or the second input may be stored as shards across a plurality of selected computing devices. The method may further comprise collecting at least one of the shards of the first input or the shards of the second input from the plurality of selected computing devices onto a single pre-processing computing device.

The results for the inner join may include a cross product for at least one of the pairs of replicated blocks.

The disclosure further provides for a system comprising a computing device adapted to communicate with a plurality of computing devices in a distributed computing environment, the computing device comprising one or more processors configured to receive a request to perform an inner join of a first input comprising a first set of key-value pairs and a second input comprising a second set of key-value pairs; determine a block size, the block size being a target number of values to be partitioned into a block; partition, for each key, the values in the first input into a first block set; partition, for each key, the values in the second input into a second block set; replicate, for each key, the first block set by a number of blocks in the second block set for the same key, to obtain a first replicated block set; replicate, for each key, the second block set by a number of blocks in the first block set for the same key, to obtain a second replicated block set; assign a block-key to each replicated block in the first replicated block set and each replicated block of the second replicated block set, the block-key comprising the key and additional information to identify the replicated block; distribute each pair of replicated blocks having matching block-keys to one of the plurality of computing devices for processing; and receive, from each of the plurality of computing devices, results for the inner join, the results for the inner join include at least one value-pair from one of the pairs of replicated blocks.

The one or more processors may be further configured to determine the block size based on at least one of a total number of the plurality of computing devices, processing capacities of the plurality of computing devices, or a uniformity in number of values per block. The one or more processors may further be configured to distribute each pair of replicated blocks based on at least one of the block size, a total number of replicated block pairs, a total number of the plurality of computing devices, or processing capacities of the plurality of computing devices. The one or more processors may further be configured to estimate an approximate number of blocks needed for each key for at least one of the first input or the second input by sampling at least one of the first input or the second input at every block-sized interval.

The disclosure yet further provides a non-transitory computer-readable storage medium storing instructions thereon, the instructions, when executed by one or more processors, cause the one or more processors to perform a method, the method comprising receiving a request to perform an inner join of stored data of a first input comprising a first set of key-value pairs and a second input comprising a second set of key-value pairs; determining a block size, the block size being a target number of values to be partitioned into a block; partitioning, for each key, the values in the first input into a first block set; partitioning, for each key, the values in the second input into a second block set; replicating, for each key, the first block set by a number of blocks in the second block set for the same key, to obtain a first replicated block set; replicating, for each key, the second block set by a number of blocks in the first block set for the same key, to obtain a second replicated block set; assigning a block-key to each replicated block in the first replicated block set and each replicated block of the second replicated block set, the block-key comprising the key and additional information to identify the replicated block; distributing each pair of replicated blocks having matching block-keys to one of a plurality of computing devices for processing; and receiving, from each of the plurality of computing devices, results for the inner join, the results for the inner join include at least one value-pair from one of the pairs of replicated blocks.

BRIEF DESCRIPTION OF THE DRAWINGS

FIGS. 4A-D are pictorial diagrams according to aspects of the disclosure.

DETAILED DESCRIPTION

Overview

Figure 1:
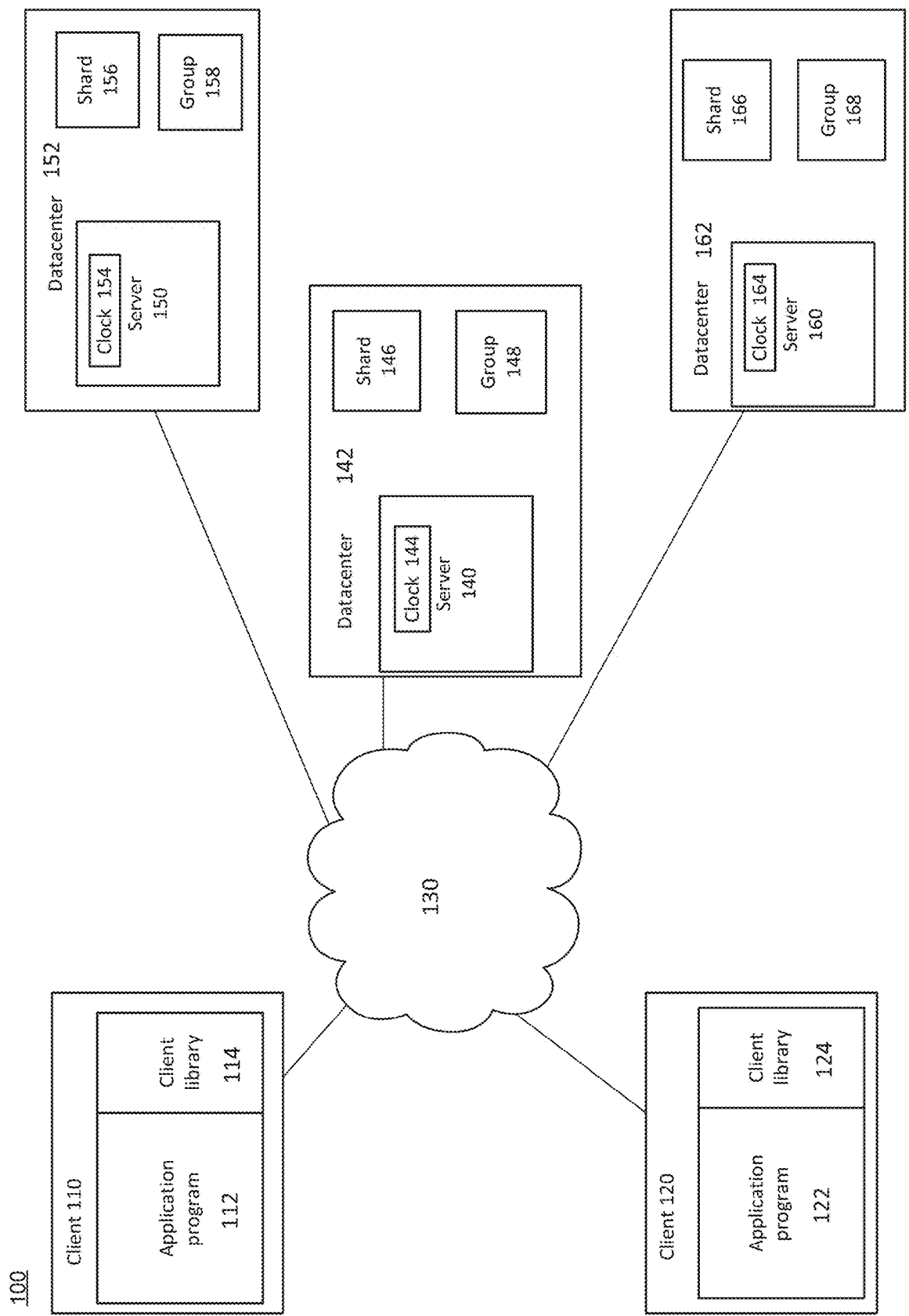
FIG. 1 is a block diagram illustrating an example system according to aspects of the disclosure.

The technology generally relates to a method and system for performing an inner join on a very large and highly sharded data set. An inner join is an operation that combines two input tables, each being a set of key-value pairs, to produce a new resulting table containing all possible combination of values from the two input tables for each matching key. An inner join of very large data sets may take certain systems significant amounts of resources and time, for instance, weeks to compute. In some instances, the operation may fail before completion which can result in the need to rerun the inner join, costing even more resources and time.

Inner joins may be especially challenging if the number of values for one or more keys in either input table is too large to fit in memory, if both input tables are arbitrarily large in both the number of keys and the number of values per key, or if the number of values per key in either input table varies greatly from key to key. For example, a first input table may have thousands of keys. Some keys may have only a few values, while other keys may have thousands of values, and in particular, one of the keys may even have 1,000,000,000 values, which means that all the values for that particular key cannot fit into a 32 GB memory and therefore cannot be processed on such a computing device. If a second input table is also arbitrarily large in both the number of keys and the number of values, and/or lacks uniformity from key to key, the inner join may become a very formidable task.

One example approach for efficiently performing an inner join is to perform it as many smaller jobs distributed to a plurality of computing devices, each smaller job involving one block of values from each of the two input tables. For example, a first input table may contain 5,000 keys with up to 1,000,000 values per key; a second input table may contain 3,000 keys with up to 2,000,000 values per key. In this example, the input tables may be partitioned into blocks having a block size of 1,000 values such that a single computing device in the system may be able to trivially handle the operation involving two blocks of this size (one from each input table). Then, for each key of the first input table, about 1,000 values may be partitioned into each block of a first block set. Likewise, for each key of the second input table, about 1,000 values may be partitioned into each block of a second block set. Then, for each key, the first block set may be replicated by a number of blocks in the second block set for the same key, resulting in a first replicated block set. Likewise, the second block set may be replicated by a number of blocks in the first block set for the same key, resulting in a second replicated block set.

Each of the replicated blocks may be assigned a block-key, which not only includes the corresponding key for all the values in the replicated block, but also additional information differentiating the replicated block from the other replicated blocks from the same input table for that particular key. Each pair of replicated blocks having the same block-key—one from each input table—may be assigned to one of a plurality of computing devices for processing. Results for the inner join may be received from the plurality of computing devices.

The approach may further include estimating the number of blocks needed for each key. For example, an approximate number of blocks needed for each key of the first input and/or the second input may be estimated by sampling at each block-sized interval. For each key, a remainder number of values is counted by assuming that each of the approximate number of blocks contains block-size number of values. The approximate number of blocks needed may be adjusted based on the counted remainder number of values. In addition, an approximate number of blocks needed for one or more keys omitted during sampling may be set.

The block-key assigned to each replicated block may include a first index, the first index may be assigned as blocks in a block set are created. The block-key may further include a second index, the second index may be assigned as the block set is replicated. In addition, the first and the second indices for replicated blocks from the second input table may be assigned in a reversed manner as the first and second indices for replicated blocks from the first input table. A block-key mapping of all the block-keys of the first and second replicated block sets may be sent to each of the plurality of computing devices involved in processing the inner join.

Each of the plurality of computing devices may process one pair of replicated blocks. Alternatively, one or more of the plurality of computing devices may process more than one pair of replicated blocks. The distribution to the plurality of computing devices may depend on a number of factors, such as the block size, a total number of replicated block pairs, a total number of the plurality of computing devices, and processing capacity of each of the plurality of computing devices. In addition, the distribution to the plurality of computing devices may further incorporate dynamic work rebalancing techniques.

The block size may be determined based on a total number of the plurality of computing devices for processing the inner join. In addition or alternatively, the block size may be determined based on a processing capacity of each of the plurality of computing devices. Thus, known capabilities of the plurality of computing devices can be used when allocating data for processing. The block size may be determined as the smallest size possible whose block-key mapping will not cause any of the plurality of computing devices to run out of operational memory. In addition, the block size may be determined further based on dynamic work rebalancing techniques.

The first input table and/or the second input table may be stored in a distributed manner Each of the plurality of computing devices may output the results it has computed into a file. Alternatively, all the results for each key may be collected such that all inner join results for a single key is located on a single computing device.

The features described herein may provide an efficient computation of inner joins of very large, and highly sharded data sets. These features may work efficiently even if both inputs for the inner join are arbitrarily large in both the number of keys and the number of values per key, and even if the number of values for the different keys follow no particular pattern. These features may even work well if values for any particular key in an input is too large to fit into memory. As such, operating in the manner described herein may reduce processing time from days or weeks to hours or even shorter timeframes. Further, the technology may readily be extended to perform inner join on more than two input tables.

Example Systems

FIG. 1 illustrates an example distributed system for performing inner joins. A plurality of computing devices, such as servers 140, 150, 160, may communicate with each other, for example, over a network 130. The servers 140, 150, 160 may further communicate with a plurality of client computing devices, such as clients 110, 120. The servers 140-160 may control storage of data in one or more databases. For example, as shown each server 140-160 is associated with a datacenter 142, 152, 162. Each datacenter 142, 152, 162 may include a plurality of computing devices for storing data. In the distributed database, data items of a database may be sharded onto multiple distinct shards, such as shards 146, 156, 166, each shard may be replicated onto multiple computing devices, such as servers, at one datacenter, for example, datacenter 142, or across multiple datacenters, such as datacenters 142, 152, and 162. For example, a large data set may have hundreds of millions of keys, a first input from this example large data set may be several terabytes (TBs) in size and have millions of values for some keys, and a second input from this example large data set may also be several TBs in size and have millions of values for some keys. The example first input and second input may each be sharded into thousands or tens of thousands of shards, such as shards 146, 156, 166 stored in the distributed system. An inner join performed on such example first input and second input could produce results that are several hundreds of TBs in size, with trillions of value-pairs for some keys.

An inner join performed on multiple shards of the large data set may be performed in a distributed manner, for example, as smaller jobs involving smaller subsets of data distributed to multiple computing devices. For instance, for the example large data set above with hundreds of millions of keys, the inner join could be performed using thousands of computing devices. In this regard, one or more computing devices or servers in the distributed system, such as servers 140, 150, 160, may be configured to create the smaller jobs involving smaller subsets of data and distribute the smaller jobs to other computing devices in the distributed system, for example, using the example methods described in detail below. These one or more servers may also be configured to receive and process the smaller jobs distributed to them, for example, using the example methods described in detail below.

Each server 140, 150, 160, may store and execute actions for multiple shard and/or shard replicas. The totality of replicas of a single shard forms a group, for example, group 148 contains all replicas of one shard, group 158 contains all replicas of another shard, and group 168 contains all replicas of yet another shard. The shard replicas may be synchronized by using consensus protocols, such as a Paxos protocol. While some shards may be replicas of other shards, some shards may be causally dependent on others. For example, bits of data written in datacenter 142, for example in shard 146 or group 148, may affect data stored in datacenter 152, for example in shard 156 or group 158. The distributed database may implement a protocol, such as Paxos, to provide consensus across the system. Each server has a local clock 144, 154, 164. In some systems, consistency across the datacenters 142, 152, 162 is maintained by the servers 140, 150, 160, which wait for a period of time to pass before publishing a write transaction. In other systems, the waiting period may instead be imposed on one or more other devices, moved in time to different actions of the server, or moved to client devices seeking to read the written data.

While only a few datacenters with a few servers, clients, shards, and groups are shown, any number of datacenters may be included in the distributed database, each of which may contain multiple servers (which may communicate with multiple clients), shards, and groups. Similarly, while each server 140, 150, 160 is shown as being associated with its own datacenter, it should be understood that in other examples the servers may be associated with one or more smaller databases. For example, one database may include multiple servers.

Each of clients 110, 120 is shown as having an application program 112, 122 and a client library 114, 124, though it should be understood that additional features of client devices may also be present. Either of the clients 110, 120 may write data to the distributed database by sending data over the network 130 to one of the servers 140, 150, 160. While only a few clients are shown, it should be understood that a vast number of client devices may communicate with the distributed database over the network 130.

The datacenters 142, 152, 162 may be positioned a considerable distance from one another. For example, the datacenters may be positioned in various countries around the world. Each datacenter 142, 152, 162 may include a number of storage devices, such as hard drives, random access memory, disks, disk arrays, tape drives, or any other types of storage devices. The datacenters 142, 152, 162 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. The datacenters 142, 152, 162 may be virtualized environments.

Figure 2:
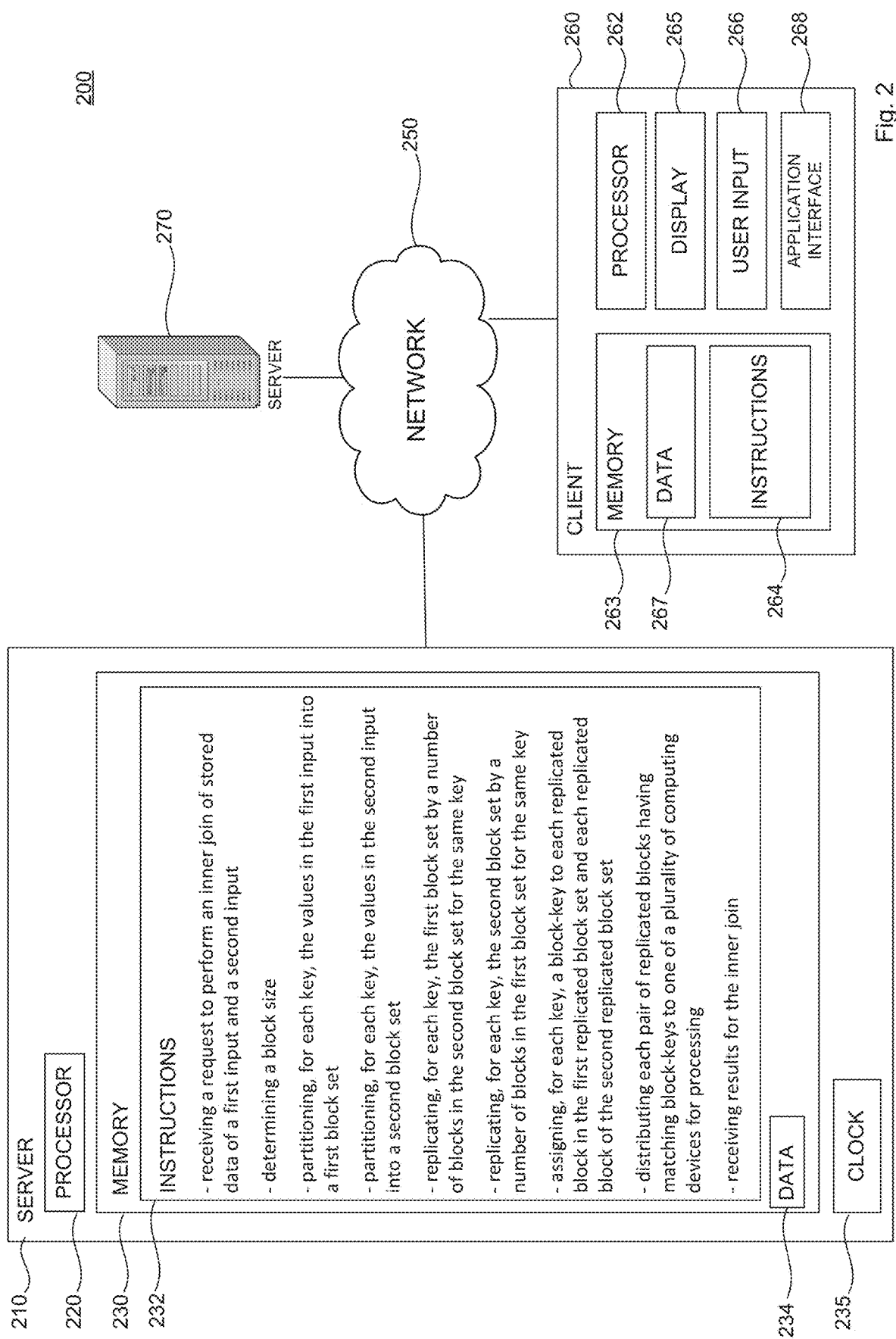
FIG. 2 is a block diagram illustrating an example system according to aspects of the disclosure.

FIG. 2 is a diagram of an example distributed system for performing inner joins. As shown, an example system 200 may include a number of servers 210 and 270 coupled to a network 250. The servers 210 and 270 may be located at different datacenters, for example, the server 210 may be the server 140 at datacenter 142 in FIG. 1, and the server 270 may be the server 150 at datacenter 152 in FIG. 1. Alternatively, the servers 210 and 270 may be located at the same datacenter, for example, the server 210 may be the server 140 at datacenter 142 in FIG. 1, and the server 270 may be another server (not shown in FIG. 1) also at datacenter 142. Thus, each of the servers 140, 150, 160 of FIG. 1 may be configured as server 210 of FIG. 2. The system may also include a client 260 capable of communication with the servers 210 and 270 over the network 250.

The server 210 may contain a processor 220, memory 230, clock 235, and other components typically present in general purpose computers. The memory 230 can store information accessible by the processor 220, including instructions 232 that can be executed by the processor 220. Memory can also include data 234 that can be retrieved, manipulated or stored by the processor 220. The memory 230 may be a type of non-transitory computer readable medium capable of storing information accessible by the processor 220, such as a hard-drive, solid state drive, tape drive, optical storage, memory card, ROM, RAM, DVD, CD-ROM, write-capable, and read-only memories. The processor 220 can be a well-known processor or other lesser-known types of processors. Alternatively, the processor 220 can be a dedicated controller such as an ASIC.

The instructions 232 can be a set of instructions executed directly, such as computing device code, or indirectly, such as scripts, by the processor 220. In this regard, the terms "instructions," "steps" and "programs" can be used interchangeably herein. The instructions 232 can be stored in object code format for direct processing by the processor 220, or other types of computer language including scripts or collections of independent source code modules that are interpreted on demand or compiled in advance. Functions, methods, and routines of the instructions are explained in more detail in the foregoing examples and the example methods below. The instructions 232 may include any of the example features described herein. For instance, the instructions 232 may include partitioning values of inputs into blocks, replicating the blocks into a necessary number of copies, assigning block-keys to the replicated blocks, distributing pairs of replicated blocks to a plurality of computing devices in the distributed system for processing, and receiving results for the inner join.

The data 234 can be retrieved, stored or modified by the processor 220 in accordance with the instructions 232. For instance, although the system and method is not limited by a particular data structure, the data 234 can be stored in computer registers, in a relational database as a table having a plurality of different fields and records, or XML documents. The data 234 can also be formatted in a computer-readable format such as, but not limited to, binary values, ASCII or Unicode. Moreover, the data 234 can include information sufficient to identify relevant information, such as numbers, descriptive text, proprietary codes, pointers, references to data stored in other memories, including other network locations, or information that is used by a function to calculate relevant data. The data 234 may store a portion of an input table or an entire input table. In addition, the data 234 may also store blocks containing partitioned values of the input table, copies of replicated blocks, a block-key mapping of the replicated blocks, and results for the inner join.

Although FIG. 2 functionally illustrates the processor 220 and memory 230 as being within the same block, the processor 220 and memory 230 may actually include multiple processors and memories that may or may not be stored within the same physical housing. For example, some of the instructions 232 and data 234 can be stored on a removable CD-ROM and others within a read-only computer chip. Some or all of the instructions and data can be stored in a location physically remote from, yet still accessible by, the processor 220. Similarly, the processor 220 can actually include a collection of processors, which may or may not operate in parallel.

Servers 210 and 270 may be at one node of network 250 and capable of directly and indirectly communicating with other nodes of the network 250. For example, the servers 210 and 270 can include a web server that may be capable of communicating with client 260 via network 250 such that it uses the network 250 to transmit information to a client application. Servers 210 and 270 may also include a number of computers, for instance, a load balanced server farm, that exchange information with different nodes of the network 250 for the purpose of receiving, processing and transmitting data to client devices. In this instance, the client computers will typically be at different nodes of the network 250 than the computers making up servers 210 and 270. Although only a few servers 210, 270 are depicted in FIG. 2, it should be appreciated that a typical system can include a large number of connected servers with each being at a different node of the network 250.

Each client 260 may be configured, similarly to servers 210 and 270, with a processor 262, memory 263, instructions 264, and data 267. Each client 260 may be a personal computer, intended for use by a person having all the internal components normally found in a personal computer such as a central processing unit (CPU), CD-ROM, hard drive, and a display device 265, for example, a monitor having a screen, a projector, a touch-screen, a small LCD screen, a television, or another device such as an electrical device that can be operable to display information processed by the processor 262, speakers, a modem and/or network interface device, user input component 266, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 260 may include an application interface module 268. The application interface module may be used to access a service made available by a server, such as servers 210 and 270. The application interface module may include sub-routines, data structures, object classes and other type of software components used to allow servers and clients to communicate with each other. In one aspect, the application interface module 268 may be a software module operable in conjunction with several types of operating systems known in the arts. For example, the client 260 may be connected to a Structured Query Language (SQL) database server that may operate in conjunction with the application interface module 268 for saving and retrieving information data. Memory 263 coupled to a client 260 may store data 267 accessed by the application interface module 268. The data 267 can also be stored on a removable medium such as a disk, tape, SD Card or CD-ROM, which can be connected to client 260.

Servers 210 and 270 and client 260 can be capable of direct and indirect communication such as over network 250. For example, using an Internet socket, a client 260 can connect to a service operating on remote servers 210 and 270 through an Internet protocol suite. Servers 210 and 270 can set up listening sockets that may accept an initiating connection for sending and receiving information. The network 250, and intervening nodes, may include various configurations and protocols including the Internet, World Wide Web, intranets, virtual private networks, wide area networks, local networks, private networks using communication protocols proprietary to one or more companies, Ethernet, WiFi (for instance, 802.81, 802.81b, g, n, or other such standards), and HTTP, and various combinations of the foregoing. Such communication may be facilitated by a device capable of transmitting data to and from other computers, such as modems (for instance, dial-up, cable or fiber optic) and wireless interfaces.

Although FIG. 2 shows server 210 and client 260 as individual blocks, each of which contains its own processor and memory, the operations described herein may involve a single computing device or many computing devices, for instance, in the "cloud." For example, various operations described herein as involving a single computing device (for instance, a single central processing unit (CPU) in a single server) may involve a plurality of computing devices (for instance, multiple processors in a load-balanced server farm). Similarly, memory components at different locations may store different portions of instructions 232 and collectively form a medium for storing the instructions. In some examples, client 260 may function as a thin client wherein server 210 performs all or nearly all operations that are not directly related to receiving and providing information to users via user input component 266 and display device 265. Various operations described herein as being performed by a computing device may be performed by a virtual computing device. By way of example, instructions 232 may be specific to a first type of server, but the relevant operations may be performed by a second type of server running a hypervisor that emulates the first type of server. The operations may also be performed by a container, for instance, a computing environment that does not rely on an operating system tied to specific types of hardware.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 3:
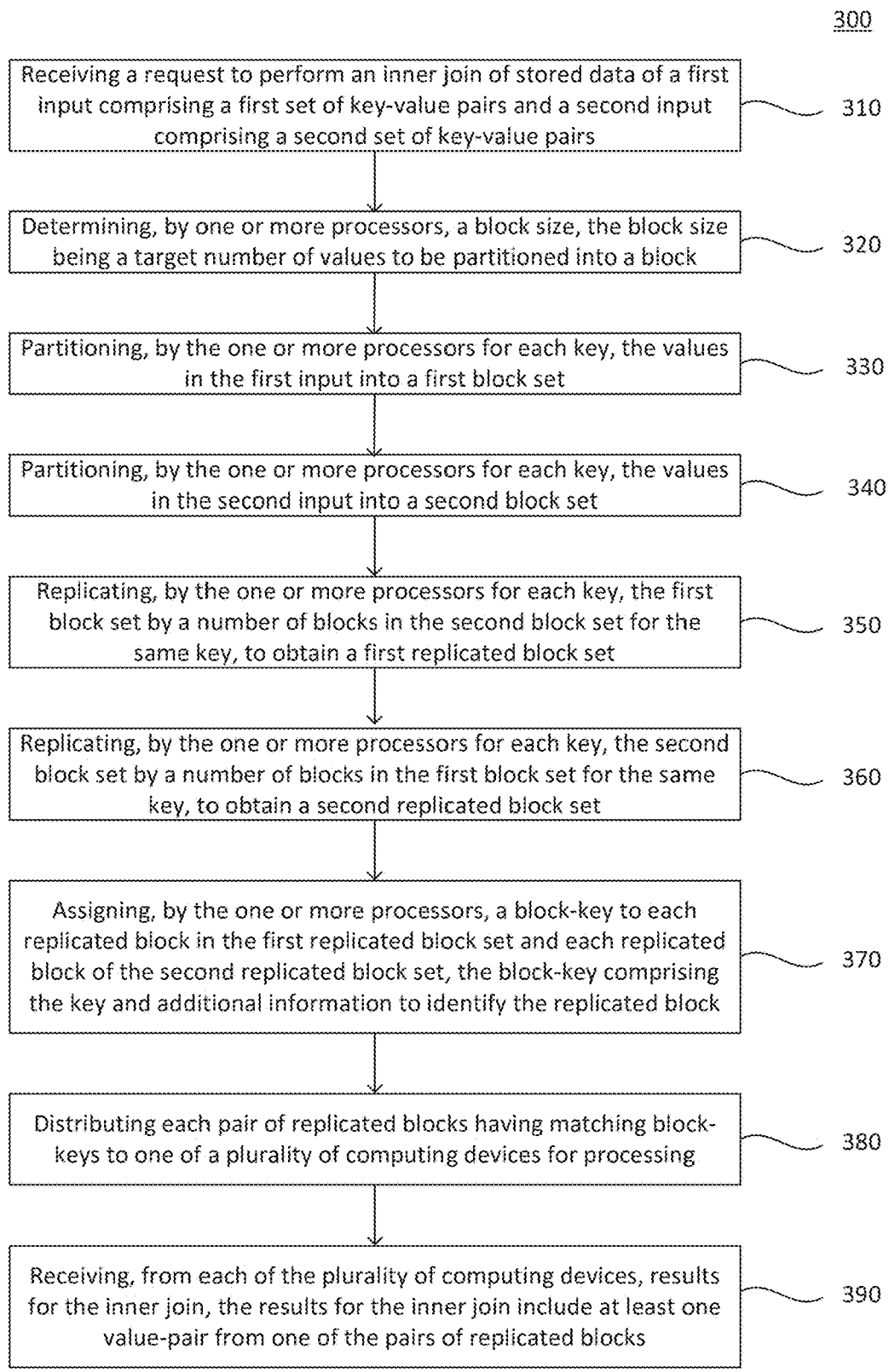
FIG. 3 is a flow diagram according to aspects of the disclosure.

FIG. 3 provides an example flow diagram 300 for efficiently performing an inner join of two very large inputs on a distributed system. FIGS. 4A-D show simplified pictorial representations of the example flow diagram 300. The example features of flow diagram 300 can be performed on one or more computing devices in a distributed system, for example, on one or more of the servers 140, 150, 160 of FIG. 1. The one or more computing devices may perform the example features of flow diagram 300 on one or more processors, such as processor 220 of FIG. 2. The one or more computing devices may store various data items in its memory, such as memory 230 of FIG. 2. For example, the flow diagram 300 may be stored, for example in instructions 232, while the input tables and various data items (such as blocks, replicated blocks, block-keys, results for the inner join) may be stored, for example in data 234.

Referring to FIG. 3, in block 310, a request is received to perform an inner join of stored data of a first input comprising a first set of key-value pairs and a second input comprising a second set of key-value pairs. The request may be received by one or more computing devices, such as one or more of servers 140, 150, 160 of FIG. 1, from a client, such as client 110 of FIG. 1. The request may be received at one or more processors, such as processor 220 of FIG. 2. The first input and the second input may be stored at one or more computing devices, for example, at one or more of servers 140, 150, 160 of FIG. 1. For example, the first input and the second input may be stored in data 234.

Figure 4A:
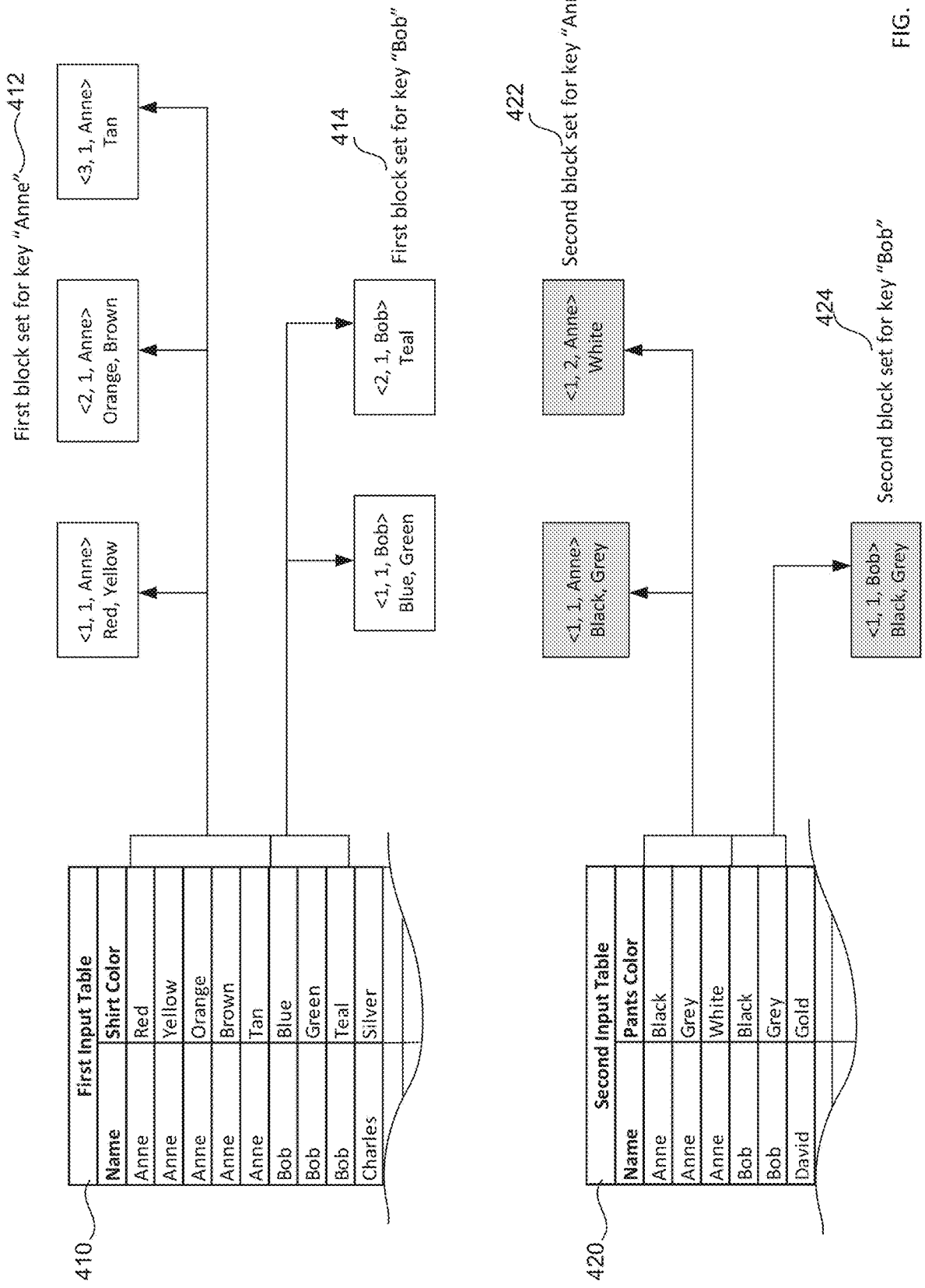

FIG. 4A shows pictorial diagrams involving two input tables and corresponding data for illustration purposes. The first input table 410 contains shirt colors that a number of persons prefer, the second input table 420 contains pants colors that a number of persons prefer. The person name in each input table is the key, while the shirt color/pants color is the value. For example, [Anne—Red] is a key-value pair from the first input table 410, [Bob—Pink] is a key-value pair from the second input table 420. Thus, for key "Anne," there are five values in the first input table 410 and three values in the second input table 420. Although for some keys, such as key "Anne" and key "Bob," there are values in each of the first and second input tables 410, 420, for some other keys, such as key "Charles" and key "David," there are only values in one of the two input tables 410, 420. The first and second input tables 410, 420 are shown here as truncated, but each may be very large tables, for example, the first input table 410 may contain 5,000 keys with up to 1,000,000 values per key; the second input table 420 may contain 3,000 keys with up to 2,000,000 values per key.

Although the first and second input tables 410, 420 in the example of FIG. 4A appear to be ordered by key, the first and second input tables 410, 420 may alternatively be unordered key-value pairs. In addition, as shown in FIG. 4A, the first and second input tables 410, 420 each have only two columns, however, either or both input tables may have multiple columns. As an example, the first input table may have a third column "Shirt Style," and a fourth column "Shirt Size." In that case, a key-value pair from the first input table may be, for example, [Anne—Red, Golf, Large].

Referring back to FIG. 3, in block 320, a block size, which is a target number of values to be partitioned into a block, is determined. Then, in block 330, the values in the first input are partitioned, for each key, into a first block set. In block 340, the values in the second input are partitioned, for each key, into a second block set. The block size may be determined by one or more computing devices, such as one or more of servers 140, 150, 160 of FIG. 1. The block size may be determined by one or more processors, such as processor 220 of FIG. 2. The values of the first input and the second input may be partitioned by one or more computing devices, such as one or more of servers 140, 150, 160 of FIG. 1. The first input and the second input may be partitioned by one or more processors, such as processor 220 of FIG. 2. The blocks in the first and second block sets may be stored at one or more computing devices, for example, at one or more of servers 140, 150, 160 of FIG. 1. For example, blocks in the first and second block sets may be stored in data 234 of FIG. 2.

FIG. 4A shows a representation of the steps of blocks 320-340 using a small block size of two. From the first input table 410, for key "Anne," two values are partitioned into block <1, 1, Anne>, two values are partitioned into block <2, 1, Anne>, and one value is partitioned into block <3, 1, Anne>, these three blocks make up the first block set for key "Anne" 412. For key "Bob," two values are partitioned into block <1, 1, Bob> and one value is partitioned into <2, 1, Bob>, these two blocks make up the first block set for key "Bob" 414. Likewise from the second input table, for key "Anne," two values are partitioned into block <1, 1, Anne>, one value is partitioned into block <1, 2, Anne>, these two blocks make up the second block set for key "Anne" 422. For key "Bob," two values are partitioned into <1, 1, Bob>, this one block make up the second block set for key "Bob" 424. The steps of blocks 320-340 are iterated for each key until all values, across all keys, in both input tables, are partitioned into blocks.

Although a very small block size is chosen for illustration purposes, the block size may be determined based a number of factors discussed further below. For example, partitioning the inputs (which may each contain millions or billions of values) into small blocks having a block size of 1,000 values may allow each computing device in the distributed system to trivially handle the operation involving two such blocks (one from each input table). For example, an inner join operation for two blocks having a block size of 1,000 values could take up about a few megabytes (MBs) of operational memory and about a couple of seconds to process, and therefore could be trivially handled by some computing devices. Similar to the block size of two example, if block size is 1,000, for each key of the first input table, about 1,000 values are partitioned into each block in a first block set, and for each key of the second input table, about 1,000 values are partitioned into each block in a second block set. For example, if there are 99,900 values for a particular key from the first input table, they may be partitioned into 100 blocks (a first block set), and for that particular key, if there are 200,005 values from the second input table, they may be partitioned into 200 blocks (a second block set).

The values may be partitioned into each block of a block set in any of a number of ways. Up to a block-sized number of values may be partitioned into each block until there is no more values for that key. For instance, if block size is 1,000 and there are 99,900 values in a particular key, then 1,000 values may be partitioned into a first block, the next 1,000 values may be partitioned into a second block, and so on, until the last 900 values are partitioned into the 100th block. Additionally or alternatively, a number of blocks needed for each key may first be determined, for example, by counting the total number of times that each key appears in the input table. Then, for each key, the blocks in a block set is set in a uniform distribution, and the values for each key are then randomly assigned into the blocks. For instance, if block size is 1,000 and there are 99,900 values in a particular key, it is first determined that 100 blocks are needed in the block set, then, the 100 blocks are set in a uniform distribution. Next, the 99,900 values may each be randomly partitioned into the 100 blocks such that the average number of values per block in the block set is roughly equal to the block size.

The partitioning may be parallelized such that more than one value may be assigned into one or more blocks at the same time.

Referring back to FIG. 3, in block 350, the first block set is replicated, for each key, by a number of blocks in the second block set for the same key, to obtain a first replicated block set. In block 360, the second block set is replicated, for each key, by a number of blocks in the first block set for the same key, to obtain a second replicated block set. The blocks of the first block set and the second block set may be replicated by one or more computing devices, such as one or more of servers 140, 150, 160 of FIG. 1. The first block set and the second block set may be replicated by one or more processors, such as processor 220 of FIG. 2. The replicated blocks in the first and second replicated block sets may be stored at one or more computing devices, for example, at one or more of servers 140, 150, 160 of FIG. 1. For example, the replicated blocks of the first and second replicated block sets may be stored in data 234 of FIG. 2.

Figure 4B:
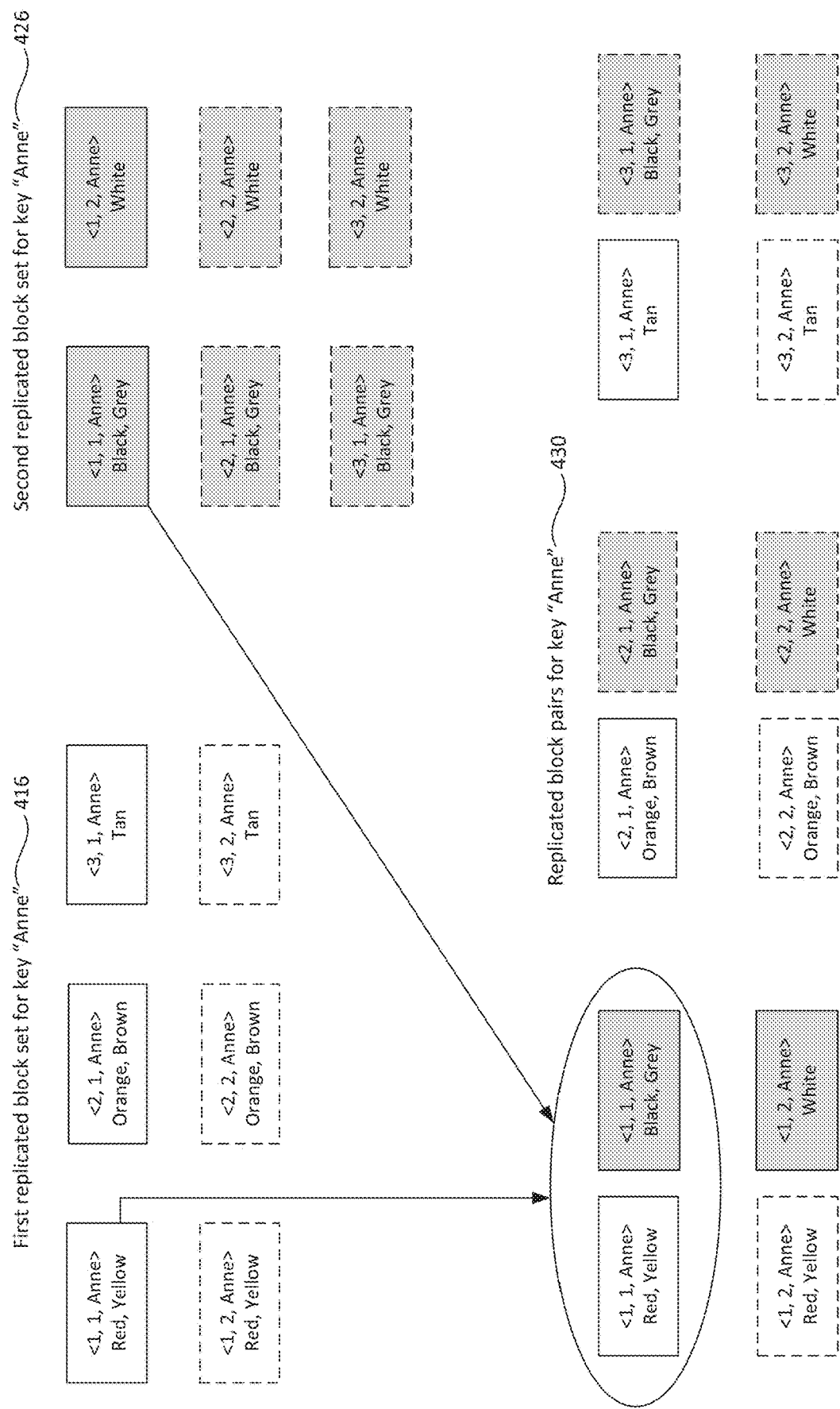

Continuing from FIG. 4A, FIG. 4B shows pictorial diagrams involving the data from the two input tables of FIG. 4A for illustration purposes. Referring to FIGS. 4A and 4B, because the second block set for key "Anne" 414 has two blocks, the first block set for key "Anne" 412 is replicated into two copies (the copies are indicated in dotted box), resulting in a first replicated block set for key "Anne" 416, with six total blocks. Likewise, because the first block set for key "Anne" 412 has three blocks, the second block set for key "Anne" 414 is replicated into three copies (the copies are indicated in dotted box), resulting in a second replicated block set for key "Anne" 426, with six total blocks. Thus, for key "Anne," there are six replicated blocks for both the first and second replicated block sets 416, 426.

For another example, with larger numbers, if the second block set has 200 blocks for a particular key, the first block set for that particular key may be replicated into 200 copies (a first replicated block set); and if the first block set has 100 blocks for that particular key, the second block set for that particular key may be replicated 100 times (a second replicated block set). Thus, for that particular key, there would be the same number of replicated blocks, 20,000, for each of the two input tables.

Referring back to FIG. 3, in block 370, each of the replicated blocks is assigned a block-key, which not only includes the corresponding key for all the values in the replicated block, but also additional information to identify the replicated block. The block-keys may be assigned by one or more computing devices, such as one or more of servers 140, 150, 160 of FIG. 1. The block-keys may be assigned by one or more processors, such as processor 220 of FIG. 2. The block-keys may be stored at one or more computing devices, for example, at one or more of servers 140, 150, 160 of FIG. 1. For example, the block-keys may be stored in data 234 of FIG. 2.

Referring to FIGS. 4A and 4B, the block-keys are shown in brackets "< >." In this example, the block-key assigned to each block include a first index, a second index, and the key to which the values in the block correspond, in the format of <first index, second index, key>. The first index may be assigned to each block in a block set to differentiate the values partitioned into the block. Thus, for key "Anne," each block of the first block set 412 is assigned a first index of 1, 2, 3, respectively. The second index may be assigned to a replicated block set to differentiate one replicated block from other copies in the replicated block set. Thus, for key "Anne," each replicated block of the first replicated block set 416 is assigned a second index of 1, 2, respectively.

The block-key also includes the corresponding key for all the values in the replicated block, to further distinguish the replicated blocks from replicated blocks for other keys. Thus, <1, 1, Anne> and <1, 1, Bob> can be distinguished from each other. This way, each replicated block across all keys of an input table has a unique block-key. For another example, with larger numbers, if values for a particular key are to be partitioned into 100 blocks and then to be replicated into 200 copies, each replicated block may be assigned a first index from 1 to 100, a second index from 1 to 200, and the particular key.

Referring to FIGS. 4A and 4B, the first and second indices for the second replicated block set for key "Anne" 426 are assigned in a reversed manner from the first and second indices for the first replicated block set for key "Anne" 416. For the second replicated block set for key "Anne" 426, the second index is assigned to each block in the second block set to differentiate the values partitioned into the block, while the first index is assigned to each replicated block in the second replicated block set to differentiate one replicated block from other copies in the second replicated block set. Thus, for key "Anne," each block of the second block set 422 is assigned a second index of 1, 2, respectively, while each replicated block of the second replicated block set 426 is assigned a first index of 1, 2, 3, respectively. In this way, each replicated block in the first replicated block set 416 has a corresponding replicated block in the second replicated block set 426 that has a matching block-key, and no two pairs of replicated blocks are pairs of the same copies of blocks.

If the first and second indices are not assigned in a reversed manner, the same values may be processed more than once, while some other values would not be processed at all. To illustrate this unwanted situation, <1, 1, Anne> and <1, 2, Anne> of the first replicated block set 416 are copies of each other, while <1, 1, Anne> and <2, 1, Anne> of the second replicated block set 426 are copies of each other. Thus, <1, 1, Anne> of the first replicated block set 416 is matched with <1, 1, Anne> of the second replicated block set 426, and if the first and second indices were not assigned in a reversed manner, <1, 2, Anne> of the first replicated block set 416 would be matched with <2, 1, Anne> of the second replicated block set 426, which means that the resulting two replicated block pairs are exact copies of each other, so the same values would be processed twice. Further, if the first and second indices were not assigned in a reversed manner, <3, 1, Anne>, <3, 2, Anne> of the first replicated block set 416 would not have any replicated blocks in the second replicated block set 426 that have matching block-keys. Therefore, reversing the first and second indices is one way to ensure that all replicated blocks are paired, and no two pairs of replicated blocks are pairs of the same copies of blocks. Referring to FIG. 4B, by matching each replicated block from the first replicated block set 416 with one from the second replicated block set 426 having the same block-key, the result is six replicated block pairs for key "Anne" 430.

A block-key mapping of all the block-keys of the first and second replicated block sets may be sent to each of the plurality of computing devices involved in processing the inner join. The block-key mapping itself may be very large, depending on how many replicated blocks are created for the inputs. In this example, the portion of the map for key "Anne" only contains six block-keys for the replicated block set. However, for example, another key of the input table set may have 20,000 replicated blocks, which means that there are 20,000 block-keys for that key alone. The size of the block-key mapping for an input of a given size depends on the block size chosen (examples of which are discussed further below). For example, for an input table of a given size, if block size is increased, the number of blocks needed to partition all the values in that input table would be decreased, which in turn decreases the size of the block-key mapping.

Block-keys may also be used for partitioning values into block sets in the random manner described above. For example, after a number of blocks needed for a particular key in the first input table is determined to be 100, the 100 blocks may be created. Each of the 100 blocks is then assigned a block-key by getting a randomly assigned first index from 1 to 100, a second index of 1 (first copy), and also the particular key. Then, the 100 blocks are set in a uniform distribution according to their first index. Next, each time a value for that particular key appears in the first input table, the value randomly gets assigned a first index from 1 to 100 and gets partitioned into the corresponding block.

Although in the examples of FIGS. 4A and 4B, the block-key is in the format of <first index, second index, key>, the block-key may also be in any of a number of formats, so long as each replicated block across all keys of an input table has a unique block-key, each replicated block in the first replicated block set has a corresponding replicated block in the second replicated block set that has a matching block-key, and no two pairs of replicated blocks are pairs of the same copies of blocks. For example, the first and second indices may be combined into one index that contains the same type of information as both the first and second indices described above. For another example, each block-key may be an encrypted number that contains the same type of information as the first index, the second index, and the key described above. For yet another example, block-keys for the first replicated block set may be different from the block keys for the second replicated block set, but would nonetheless allow matching of the replicated block pairs. For instance, instead of assigning the first and second indices in a reversed manner as described above, the matching may be done in a reversed manner so that replicated blocks are paired by matching the first index of the first replicated block set with the second index of the second replicated block set, and the second index of the first replicated block set with the first index of the second replicated block set.

Referring back to FIG. 3, in block 380, each pair of replicated blocks having the matching block-key—one from each input table—is distributed to one of a plurality of computing devices for processing. In addition, the pairs may only be distributed to available computing devices. For example, one of the computing devices, such as server 140 of FIG. 1, may determine that a plurality of computing devices in its distributed system, such as servers 150 and 160 of FIG. 1, have sufficient operational memory available to process one or more pairs of replicated blocks, server 140 then distributes one or more pairs of replicated blocks to servers 150, 160 for processing. The pairs of replicated blocks may be distributed by one or more processors, such as processor 220 of FIG. 2. The pairs of replicated blocks may be stored at one or more computing devices, for example, at one or more of servers 140, 150, 160 of FIG. 1. For example, the pairs of replicated blocks may be stored in data 234 of FIG. 2.

Referring to FIG. 4B, there are six replicated block pairs for key "Anne" 430, each pair having a matching block-key. Each of the six replicated block pairs for key "Anne" 430 may be distributed to a computing device for processing. Each of the plurality of computing devices may process one pair. Alternatively, one or more of the plurality of computing devices may process more than one pair. For example, the six replicated block pairs for key "Anne" 430 may be sent to six different computing devices, each processing one pair; or to three computing devices, each processing two pairs; or to two computing devices, one processing two pairs and the other processing four pairs; or all to one computing device, and so on.

The distribution of the replicated block pairs may be based on any of a number of factors. The distribution may depend on the block size, the total number of replicated block pairs, a total number of the plurality of computing devices in the distributed system, and the processing capacity of each of the plurality of computing device. For example, for two large inputs, a block size of 1,000 is chosen, resulting in a total of 2,000,000 replicated block pairs, 500 computing devices are in the distributed system, and each of the 500 computing device has a 32 GB operational memory, the 2,000,000 pairs may be distributed to the 500 computing devices, each with 4,000 pairs to process. If, however, 2,000,000 computing devices were in the distributed system, the 2,000,000 pairs could be evenly distributed to all 2,000,000 computing devices, each processing one pair; if more than 2,000,000 computing devices were in the distributed system, some of the computing devices would not get any pairs to process. Thus, for an input of a given size, a smaller block size may have the added benefit of ensuring that all the computing devices in the distributed system are distributed with one or more pairs of replicated blocks to process, thereby more efficiently using the resources of the distributed system. Further, if the 500 computing devices in the distributed system do not have the same operational memory, the 2,000,000 pairs may be distributed such that the computing devices with larger operational memories would process more pairs than the computing devices with smaller memories, and computing devices with insufficient operational memory to process even a single pair of blocks having a block size of 1,000 would not be distributed with any pair.

The distribution may incorporate dynamic work rebalancing techniques. Continuing from the example above, if the 2,000,000 replicated block pairs were initially sent to 500 computing devices, each with 4,000 pairs to process. For any of a number of reasons, some computing devices may process the jobs faster than others, some computing devices may process significantly slower than others, and some computing devices may stall or fail. Thus, the 500 computing devices may be monitored, and if it is determined that one or more computing devices are processing very slowly (or stalling/failing), the one or more computing devices may send some or all of the pairs to computing devices that are processing fast (or at least processing normally), or send some or all of the pairs to computing devices that are idle.

Referring back to FIG. 3, in block 390, results for the inner join are received from the plurality of computing devices. The results may include a cross product or part of a cross product for one or more pairs of replicated blocks. A cross product on a pair of replicated blocks (as illustrated below) is obtained by iterating all values in one replicated block over each value of the other replicated block, resulting in all possible combinations of value-pairs from the pair of replicated blocks. The results may include all the cross products collected from all the pairs of replicated blocks for one key, or all the cross products collected from all pairs of replicated blocks for all the keys, or any subset thereof. The results may be further formatted and/or encoded in any of a number of ways. The results of the inner join may also be collected into a file for output or further processing.

Referring back to FIG. 1, one of the computing devices, such as server 140 of FIG. 1, may receive some or all value-pairs of a cross product for each pair of replicated blocks it had previously distributed to servers 150 and 160 in block 380. For example, the results for the inner join may be received at one or more processors, such as processor 220 of FIG. 2. The results for the inner join may be stored in data 234 of FIG. 2.

As another alternative, the results for the inner join for all pairs of replicated blocks for each key may be separately collected on one or more computing devices. For example, the cross products for all pairs of replicated blocks for a first key may be collected and stored on server 140 of FIG. 1, the cross products for all pairs of replicated blocks for a second key may be collected and stored on server 150 of FIG. 1, and so on.

Figure 4C:
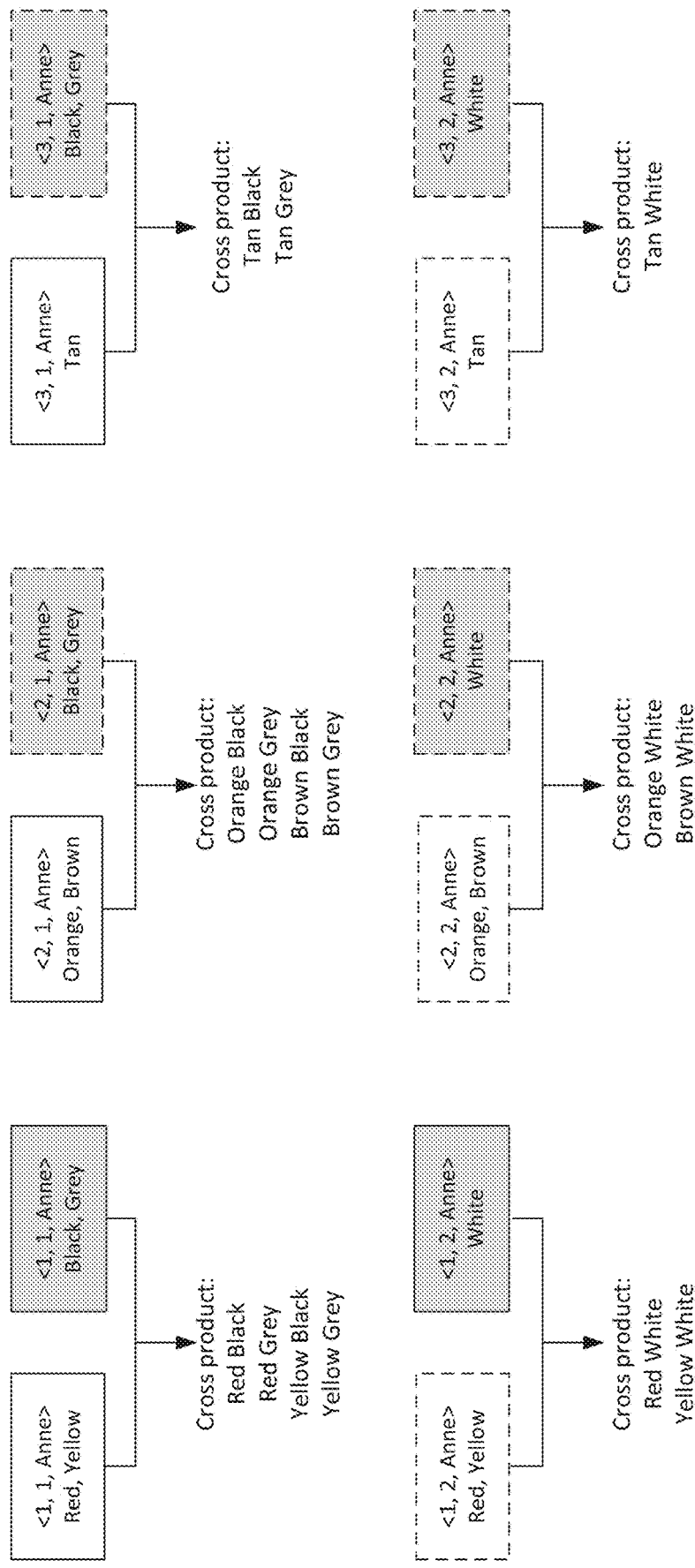

Continuing from FIG. 4B, FIG. 4C shows pictorial diagrams involving the data from the two input tables of FIG. 4A for illustration purposes. Referring to the example of FIG. 4C, each of the six pairs of replicated blocks for key "Anne" 430 was processed. The processing shown here involves taking a cross product of the values in the pair of replicated blocks. For example, the cross product of [red, yellow] and [black, grey] are the four value-pairs [red black, red grey, yellow black, yellow grey]. Results for the inner join may include all or some subset of the value-pairs in the cross products for key "Anne" 440 (for instance, only the value-pairs involving "Red," first five value-pairs, every other value-pairs, etc.). All or some subset of value-pairs in the cross products for other keys (for instance, key "Bob") may also be part of the results for the inner join. The results of the inner join may be further formatted and/or encoded in any of a number of ways. The results of the inner join may also be collected into a file for output or further processing.

Continuing from FIG. 4C, FIG. 4D shows pictorial diagrams involving the data from the two input tables of FIG. 4A for illustration purposes. Referring to the example of FIG. 4D, the file here presents the results of the inner join in a table called "Inner Join Resulting Table" 450. Instead of a table, the results for the inner join from each of the plurality of computing devices may be presented in other formats or collected for further processing, such as going through another operation.

Figure 5:
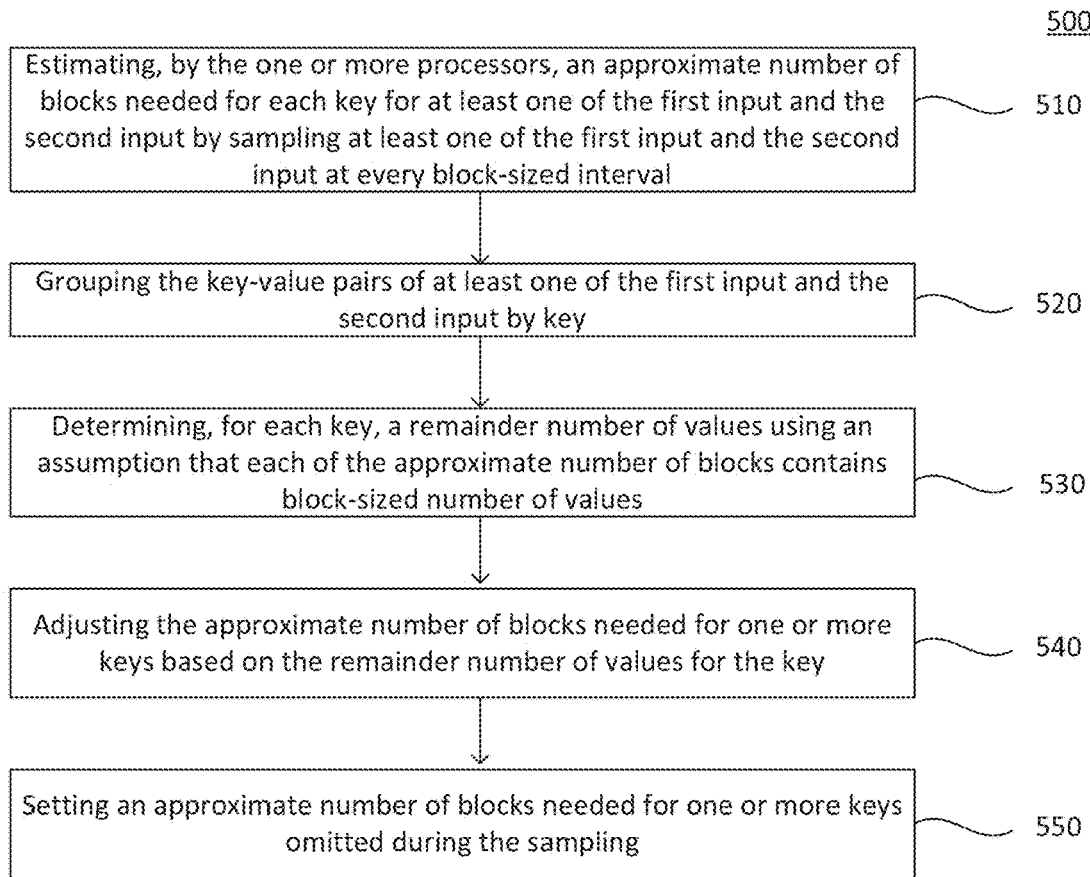
FIG. 5 is a flow diagram according to aspects of the disclosure.

FIG. 5 shows another example flow diagram 500 for efficiently performing an inner join of two very large inputs on a distributed system that includes estimating the number of blocks needed for each key. For example, some or all of the features of flow diagram 500 may be performed in conjunction with the flow diagram 300. The simplified pictorial representations shown in FIG. 4A are also used below to illustrate the features of example flow diagram 500. The example features of flow diagram 500 can be performed on one or more computing devices in a distributed system, for example, on one or more of the servers 140, 150, 160 of FIG. 1. The one or more computing devices may perform the example features of flow diagram 500 on one or more processors, such as processor 220 of FIG. 2. The one or more computing devices may store various data items in its memory, such as memory 230 of FIG. 2. For example, the flow diagram 500 may be stored in instructions 232, while the input tables and various data items (such as blocks, replicated blocks, block-keys, results) may be stored in data 234.

In block 510, an approximate number of blocks needed for each key of at least one of the first input and the second input is estimated by sampling at least one of the first input and the second input at every block-sized interval. The sampling may be performed by one or more computing devices, such as one or more of servers 140, 150, 160 of FIG. 1. The sampling may be performed by one or more processors, such as processor 220 of FIG. 2. The first input and the second input, and sampling results may be stored at one or more computing devices, for example, at one or more of servers 140, 150, 160 of FIG. 1. For example, the first input and the second input, and sampling results, may be stored in data 234.

Referring back to FIG. 4A, the block size here is two, so the first input table 410 may be sampled at every two key-value pairs for the key. Here, the sampling result for the truncated portion of the first input table 410 shown here is "Anne," "Anne," "Anne," "Bob," "Charles." After going through the entire first input table 410, a count is obtained for each key, which is the approximate number of blocks needed for each key for the first input table. For example, if the count is Anne—3, Bob—1, Charles—123, Jane—4,680, Mary—25,023, etc., these would be the approximate number of blocks needed for each key. Although accuracy is compromised by sampling, significant amount of time may be saved. Here, sampling at every other key-value pair means that the key for only half of the key-value pairs are actually known, however, it also only takes half the time compared to counting at every single key-value pair. For another example, if block size is 1,000, sampling at every 1,000 key-value pair saves counting time by 1,000 times, which may significantly increase efficiency.

In block 520, the key-value pairs of at least one of the first input and second input are grouped by key. The grouping may be performed by one or more computing devices, such as one or more of servers 140, 150, 160 of FIG. 1. The grouping may be done at one or more processors, such as processor 220 of FIG. 2. The grouped first input and/or the second input may be stored at one or more computing devices, for example, at one or more of servers 140, 150, 160 of FIG. 1. For example, the grouped first input and/or the second input may be stored in data 234.

Referring back to FIG. 4A, although the key-value pairs in the truncated portion of the first input table 410 appear to be already grouped by key, assume that key-value pairs in the rest of the first input table 410 are not grouped by key, for example, the key-value pairs after Charles may appear as [Charles—red], [Jane—blue], [Charles—pink], [Zack—white], [Jane—purple], . . . , and so on. The key-value pairs of the first input table 410 are then grouped by key such that all values having the same key are grouped together. Note that the order that the keys appear do not matter, for example, all the values for key "Zack" may appear before all the values for key "Jane."

In block 530, a remainder number of values for each key is determined using an assumption that each of the approximate number of blocks contains block-sized number of values. The remainder numbers of values may be determined by one or more computing devices, such as one or more of servers 140, 150, 160 of FIG. 1. The remainder numbers of values may be determined by one or more processors, such as processor 220 of FIG. 2. The remainder numbers of values may be stored at one or more computing devices, for example, at one or more of servers 140, 150, 160 of FIG. 1. For example, the remainder numbers of values may be stored in data 234.

Referring back to FIG. 4A, for the first input table 410, the approximate number of blocks for key "Anne" is three, and the block size is two. Considering the values grouped by key "Anne," because of the assumption that the approximate number of blocks each contain block-size number of values, the first six values for key "Anne" may be skipped, and by start counting at the seventh value, which does not have key "Anne," it is determined that the remainder number of values for key "Anne" is zero.

For another example, the approximate number of blocks for key "Charles" is 123. Because it is assumed that the approximate number of blocks each contain block-sized number of values, the first 236 values for key "Charles" may be skipped, and by start counting at the 237th value, it is determined that the 237th and 238th values are also for key "Charles," but the 239th value is for another key. Thus, it is determined that the remainder number of values for key "Charles" is two.

In block 540, the approximate number of blocks for one or more keys is adjusted based on the remainder number of values. The approximate numbers of blocks may be adjusted by one or more computing devices, such as one or more of servers 140, 150, 160 of FIG. 1. In this regard, the approximate numbers of blocks may be adjusted by one or more processors, such as processor 220 of FIG. 2. The adjusted approximate numbers of blocks may be stored at one or more computing devices, for example, at one or more of servers 140, 150, 160 of FIG. 1. For example, the adjusted approximate numbers of blocks may be stored in data 234.

Referring back to FIG. 4A, the remainder number of values for key "Anne" is zero, therefore, there is no need to adjust the approximate number of blocks. For another example, the remainder number of values for key "Charles" is two, therefore the approximate number of blocks for key "Charles" may be adjusted from 123 to 124. A predetermined threshold value may be set such that the approximate number of blocks for each key is adjusted only if the remainder number of values is above the predetermined threshold value. Continuing from the example for "Charles," if the predetermined threshold value is five, but the remainder number of values is two, which is less than five, then the approximate number of blocks for key "Charles" would not be adjusted. In that case, the two extra values for key "Charles" would just be partitioned into one or more of the 123 blocks.

In block 550, an approximate number of blocks needed for one or more keys omitted during sampling is determined. The approximate numbers of blocks for one or more keys omitted during sampling may be set by one or more computing devices, such as one or more of servers 140, 150, 160 of FIG. 1. The approximate numbers of blocks for one or more keys omitted during sampling may be set by one or more processors, such as processor 220 of FIG. 2. The approximate numbers of blocks for one or more keys omitted during sampling may be stored at one or more computing devices, for example, at one or more of servers 140, 150, 160 of FIG. 1. For example, the approximate numbers of blocks for one or more keys omitted during sampling may be stored in data 234.

Referring back to FIG. 4A, suppose the next key-value pair after [Charles—Silver] is [Ed—Grey], sampling at every other value would omit [Ed—Grey], and if this is the only key-value pair for key "Ed" in the first input table 410, there would not be an approximate number of blocks for key "Ed." After the key-value pairs of the first input table 410 are grouped by key, it may be determined that, although the grouping results from block 520 indicate that the first input table 410 has key "Ed," the sampling results from block 510 have no approximate number of blocks for key "Ed." For omitted keys where no approximate number of blocks were determined during sampling, the approximate number of blocks may be set to one. Additionally or alternatively, an approximate number for omitted keys where no approximate number of blocks were determined during sampling may be set by actually counting the number of values for the omitted key, and divide the number of values by the block size.

The estimated number of blocks per key may also be used to vary the block size. An estimated size of the block-key mapping may be determined from the approximate numbers of blocks for all the keys. Based on the estimated size of the block-key mapping, the one or more computing devices, such as servers 140, 150, 160, could determine that, though block-sized number of values may be appropriate for each of servers 140, 150, 160 to process, if each of servers 140, 150, 160 must also keep the block-key mapping in its operational memory, at least some of the servers 140, 150, 160 may run out of operational memory. Therefore, in such cases the block size may be increased accordingly.

Referring back to block 320 of FIG. 3, the block size may be determined by one or more computing devices, such as one or more of servers 140, 150, 160 of FIG. 1, by one or more processors, such as processor 220 of FIG. 2. Having introduced various concepts above, the factors that the block size may be based on will be discussed below. The block size may be determined based on a number of the plurality of computing devices for processing the inner join. For instance, if there is a large number of computing devices for processing the inner join, the block size may be set smaller such that each computing device may perform a smaller job, thereby speeding up the process at each of the plurality of computing devices. The block size may be determined based on a processing capacity of each of the plurality of computing devices. For instance, if each of the plurality of computing devices has a large operational memory, the block size may be increased such that the blocks may be replicated fewer times, thereby saving the overall space taken on the operational memory across all the plurality of computing devices. Thus, known capabilities of the plurality of computing devices can be used in deciding block size, and therefore the partitioning of data for processing. The block size may be determined as the smallest size possible whose block-key mapping will not cause any of the plurality of computing devices to run out of operational memory.

The block size may be determined based on dynamic work rebalancing techniques. Smaller block size increases uniformity in the number of values partitioned into the blocks, this means that it is less likely that one or more computing devices would run much slower than others due to uneven workloads. To illustrate, if the block size is 1,000, each replicated block in a replicated block set may have anywhere from 1 to about 1,000 values, this results in 20,000 replicated block pairs for one key, distributed to 20 computing devices, each processing 1,000 replicated block pairs. There is a chance that some of the 20 computing devices may receive replicated block pairs that are at the higher end of the range (for instance, block pairs that contain about 1,000 values), while other computing devices may receive replicated block pairs that are at the lower end or middle of the range. The computing devices that happen to receive more of the large replicated block pairs would therefore more likely to stall. If, instead. the block size is 10, each replicated block in the replicated block set may have anywhere from 1 to about 10 values (much smaller than 1 to about 1,000 values), and if that produces 2,000,000 replicated block pairs for the key, still distributed to 20 computing devices, each processing 100,000 replicated block pairs, the chance that any computing device may receive particularly large replicated blocks is significantly reduced. Therefore, reducing the block size increases the uniformity in the number of values amongst the replicated block pairs, making it less likely that any computing device would stall, which may reduce the need for dynamic work rebalancing. Further, dynamic work rebalancing may be done more efficiently when the blocks are smaller and more uniform in the number of values. For example, instead of moving one big replicated block pair with 1,000 values per block from a stalling computing device to another computing device, moving 100 small replicated block pairs with 10 values per block may be a lot easier, and also has the potential to be distributed to more than one computing devices (spreading the workload from the stalling computing device, instead of dumping the entire workload on another computing device).

In each of the foregoing examples, the first input table and/or the second input table, such as the first input table 410 and the second input table 420 of FIG. 4A, may themselves be stored in a distributed manner (sharded over multiple computing devices). For instance, the first input may be stored as shards located on more than one computing devices, such as on servers 140, 150, 160 of FIG. 1. Although the first input table and/or the second input table may be stored as shards on multiple computing devices, some or all of the pre-processing for one or both of the input tables may be performed locally where the key-value pairs of the input tables are stored. For instance, the shard containing parts of the first input table on server 140 may have its values locally partitioned into blocks. Then, the blocks on server 140 may also be locally replicated into the necessary number of copies. Further, the replicated blocks on server 140 may be locally assigned block-keys. Alternatively, although the first input table and/or the second input table are stored as shards on multiple computing devices, the entire input table may first be collected on a single computing device to be pre-processed. For instance, all the shards of the first input table located on servers 140, 150, 160 of FIG. 1 may first be collected onto a single computing device, such as server 140, then, on this single computing device, the entire first input table may have its values partitioned into blocks, the blocks replicated into the necessary number of copies, and the replicated blocks assigned block-keys.

Although the examples described herein relate to an inner join of two input tables, the features described herein may be readily extended to inner join any number of input tables. For example, to perform an inner join of three input tables, two of the input tables may first be inner joined into an intermediate table using the example methods described above, then the intermediate table may be inner joined with the third input table to produce a resulting table that is the inner join of all three input tables. Alternatively, the example methods described above may be simultaneously performed on all three input tables. In short, values from the three input tables are partitioned into three block sets for each key, each of the three block set is replicated by a number equal to a product of the numbers of blocks in the other two block sets for the same key, block-keys are assigned to each replicated block in the three replicated block sets, the replicated blocks from the three replicated block sets are grouped by matching keys, the replicated block groupings are distributed to a plurality of computing devices for processing, and results for the inner join are received from the plurality of computing devices.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method, comprising:
receiving a request to perform an inner join of stored data of a first input comprising a first table with a first set of key-value pairs and a second input comprising a second table with a second set of key-value pairs, each set of key-value pairs comprising at least one key and at least one value;
determining, by one or more processors, a block size, the block size being a target number of values to be partitioned into a block;
partitioning, by the one or more processors for each key, the values in the first input into a first block set;
partitioning, by the one or more processors for each key, the values in the second input into a second block set;
replicating, by the one or more processors for each key, the first block set by a number of blocks in the second block set for the same key, to obtain a first replicated block set;
replicating, by the one or more processors for each key, the second block set by a number of blocks in the first block set for the same key, to obtain a second replicated block set;
assigning, by the one or more processors, a block-key to each replicated block in the first replicated block set and each replicated block of the second replicated block set, the block-key comprising the key and additional information to identify the replicated block;
distributing, by the one or more processors, each pair of replicated blocks having matching block-keys to one of a plurality of computing devices for processing; and
receiving, from each of the plurality of computing devices, results for the inner join, the results for the inner join include at least one value-pair from one of the pairs of replicated blocks;
wherein the results from the inner join include a new resulting table containing all possible combination of values from the first input and second input for each matching key.

2. The method according to claim 1, wherein determining the block size is based on at least one of a total number of the plurality of computing devices, processing capacities of the plurality of computing devices, or a uniformity in number of values per block.

3. The method according to claim 2, wherein the block size is a smallest block size whose block-key mapping will not cause any of the plurality of computing devices to run out of operational memory.

4. The method according to claim 1, wherein at least one of the partitioning of values in the first input or the partitioning of values in the second input is based on a uniform distribution.

5. The method according to claim 1, wherein the block-key comprises a first index, the first index being assigned sequentially as the values in the first input are partitioned into the first block set and the values in the second input are partitioned into the second block set.

6. The method according to claim 1, wherein the block-key comprises a second index, the second index being assigned sequentially as the first block set and second block set are replicated.

7. The method according to claim 1, further comprising:
sending a block-key mapping containing all the block-keys to each of the plurality of computing devices.

8. The method according to claim 1, wherein the distributing to the plurality of computing devices is based on at least one of the block size, a total number of replicated block pairs, a total number of the plurality of computing devices, or processing capacities of the plurality of computing devices.

9. The method according to claim 1, further comprising:
estimating, by the one or more processors, an approximate number of blocks needed for each key for at least one of the first input or the second input by sampling at least one of the first input or the second input at every block-sized interval.

10. The method according to claim 9, further comprising:
grouping the key-value pairs of at least one of the first input or the second input by key;
determining, for each key, a remainder number of values based on an assumption that each of the approximate number of blocks contains block-sized number of values; and
adjusting the approximate number of blocks needed for one or more keys based on the remainder number of values for the key.

11. The method according to claim 10, wherein the approximate number of blocks needed for one or more keys is adjusted when the remainder number of values for the key is greater than a predetermined threshold value.

12. The method according to claim 9, further comprising:
determining that one or more keys are omitted during the sampling; and
setting an approximate number of blocks needed for the one or more keys omitted during the sampling.

13. The method according to claim 1, wherein at least one of the first input or the second input is stored as shards across a plurality of selected computing devices.

14. The method according to claim 13, further comprising:
collecting at least one of the shards of the first input or the shards of the second input from the plurality of selected computing devices onto a single pre-processing computing device.

15. The method according to claim 1, wherein the results for the inner join include a cross product for at least one of the pairs of replicated blocks.

16. A system, comprising:
a computing device adapted to communicate with a plurality of computing devices in a distributed computing environment, the computing device comprising one or more processors configured to:
receive a request to perform an inner join of a first input comprising a first table with a first set of key-value pairs and a second input comprising a second table witha second set of key-value pairs, each set of key-value pairs comprising at least one key and at least one value;
determine a block size, the block size being a target number of values to be partitioned into a block;
partition, for each key, the values in the first input into a first block set;
partition, for each key, the values in the second input into a second block set;
replicate, for each key, the first block set by a number of blocks in the second block set for the same key, to obtain a first replicated block set;
replicate, for each key, the second block set by a number of blocks in the first block set for the same key, to obtain a second replicated block set;
assign a block-key to each replicated block in the first replicated block set and each replicated block of the second replicated block set, the block-key comprising the key and additional information to identify the replicated block;
distribute each pair of replicated blocks having matching block-keys to one of the plurality of computing devices for processing; and
receive, from each of the plurality of computing devices, results for the inner join, the results for the inner join include at least one value-pair from one of the pairs of replicated blocks; wherein the results from the inner join include a new resulting table containing all possible combination of values from the first input and second input for each matching key.

17. The system according to claim 16, wherein the one or more processors are further configured to:
determine the block size based on at least one of a total number of the plurality of computing devices, processing capacities of the plurality of computing devices, or a uniformity in number of values per block.

18. The system according to claim 16, wherein the one or more processors are further configured to:
distribute each pair of replicated blocks based on at least one of the block size, a total number of replicated block pairs, a total number of the plurality of computing devices, or processing capacities of the plurality of computing devices.

19. The system according to claim 16, wherein the one or more processors are further configured to:
estimate an approximate number of blocks needed for each key for at least one of the first input or the second input by sampling at least one of the first input or the second input at every block-sized interval.

20. A non-transitory computer-readable storage medium storing instructions thereon, the instructions, when executed by one or more processors, cause the one or more processors to perform a method, the method comprising:
receiving a request to perform an inner join of stored data of a first input comprising a first table with a first set of key-value pairs and a second table with a second input comprising a second set of key-value pairs, each set of key-value pairs comprising at least one key and at least one value;
determining a block size, the block size being a target number of values to be partitioned into a block;
partitioning, for each key, the values in the first input into a first block set;
partitioning, for each key, the values in the second input into a second block set;
replicating, for each key, the first block set by a number of blocks in the second block set for the same key, to obtain a first replicated block set;
replicating, for each key, the second block set by a number of blocks in the first block set for the same key, to obtain a second replicated block set;
assigning a block-key to each replicated block in the first replicated block set and each replicated block of the second replicated block set, the block-key comprising the key and additional information to identify the replicated block;
distributing each pair of replicated blocks having matching block-keys to one of a plurality of computing devices for processing; and
receiving, from each of the plurality of computing devices, results for the inner join, the results for the inner join include at least one value-pair from one of the pairs of replicated blocks;
wherein the results from the inner join include a new resulting table containing all possible combination of values from the first input and second input for each matching key.

* * * * *